UNITED STATES PATENT OFFICE.

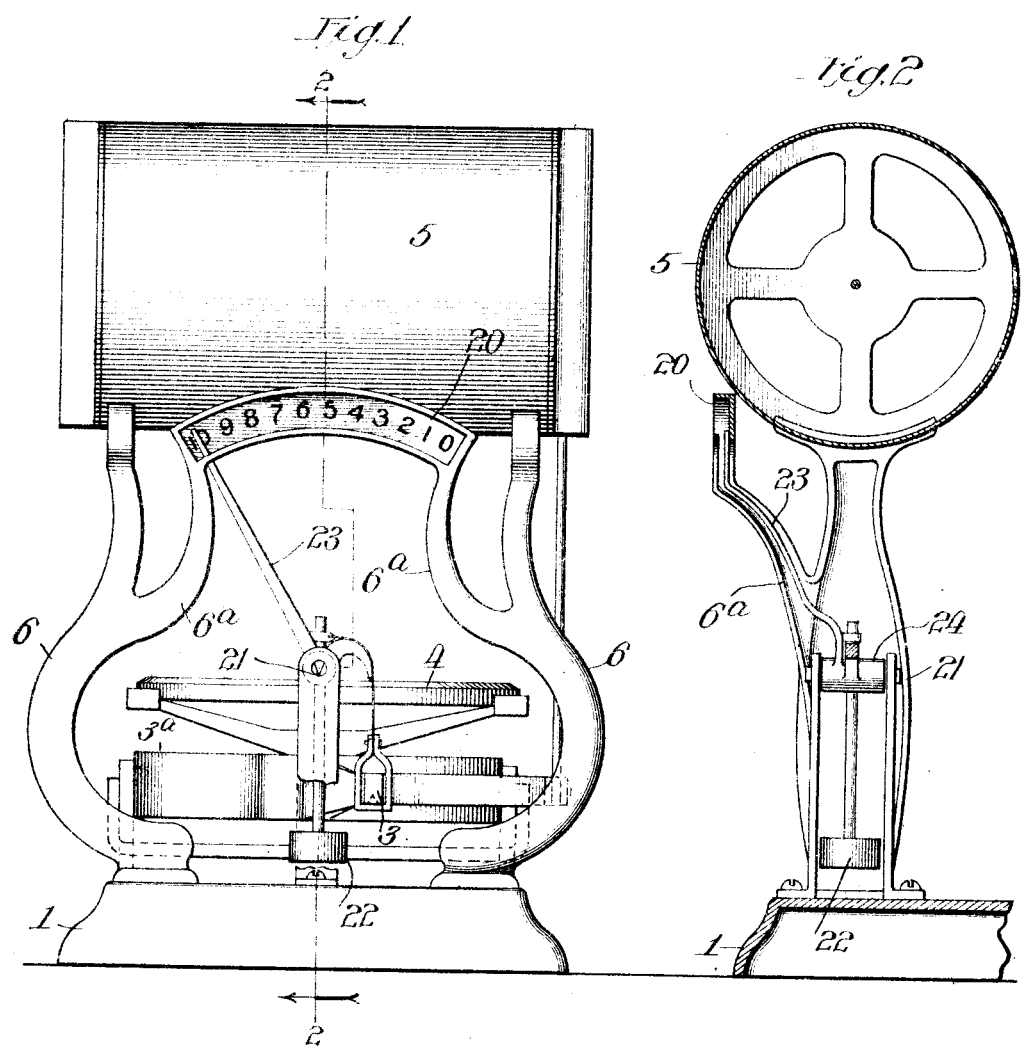

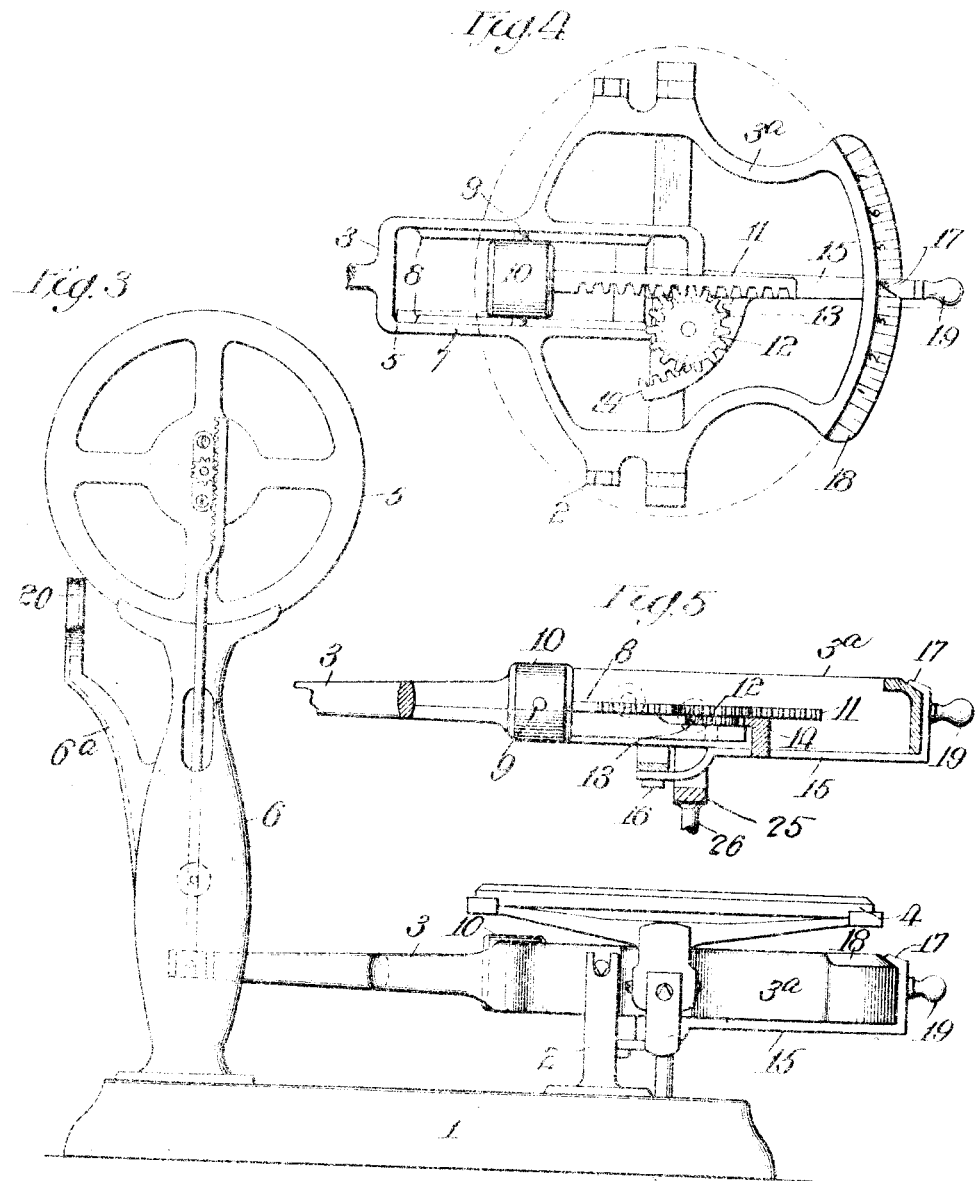

ALLEN DE VILBISS, JR., OF TOLEDO, OHIO, ASSIGNOR TO TOLEDO SCALE COMPANY, OF NEWARK, NEW JERSEY, A CORPORATION OF NEW JERSEY.

SCALE.

1,063,169.      Specification of Letters Patent.      Patented May 27, 1913.

Application filed May 23, 1904, Serial No. 209,396. Renewed September 23, 1912. Serial No. 721,925.

*To all whom it may concern:*

Be it known that I, ALLEN DE VILBISS, Jr., a citizen of the United States, residing at Toledo, Lucas county, Ohio, have invented certain new and useful Improvements in Scales, of which the following is a specification.

My invention has relation to scales, more particularly to those of the price-computing type by which are indicated both the weight and the value of an article or commodity at so much per pound or other unit of weight.

My invention pertains to a novel and efficient tare device for such scales and also to a novel construction and arrangement of what is commonly designated "back indication," or means for indicating to the customer, on his side of the scale, the weight of the article, while both the weight and the price or value of the article are indicated on the other or salesman's side of the scale.

With regard to the tare device, the object of this part of my invention is to provide simple and efficient means for compensating for the tare of any receptacle or container placed on the scale and for indicating the amount of such tare. In a prior application filed by me on November 10, 1903, Serial Number 180,595, I have shown and described a tare weight which was arranged to move or swing in relation to the scale beam on a pivot, but in the present instance I provide for the shifting or moving of a tare weight longitudinally of the scale beam in a novel manner and by means of simple and reliable mechanism, with the result that the tare may be indicated and provided for by the salesman in a most expeditious way.

With regard to the back indication forming the other principal feature of my invention, I have herein illustrated the barrel or drum type of computing mechanism which is usually provided with a slot or sight opening on the customer's side to expose weight indications, but the objection to this arrangement resides in the fact that only one weight indication or number is wholly exposed through such sight opening, so that unless the barrel stops at a point to indicate an even number of pounds, the customer is unable to know or determine whether the article on the scale weighs more or less than such number of pounds. In my present and improved arrangement, I dispense with such sight opening and provide a separate and independent back indication comprising a dial exposing all the weight indications and having a pointer, actuated by the scale mechanism, for sweeping over the dial and capable of indicating to the customer at a glance the exact number of pounds and fractions thereof.

The various features of advantage and points of utility possessed by my improved scale as to construction and mode of operation will be made apparent by the description hereinafter given.

In the drawings, Figure 1 is an end elevation of my improved scale; Fig. 2 a section on line 2—2 of Fig. 1; Fig. 3 a side elevation thereof with one of the end caps of the barrel or drum removed to expose the operating mechanism; Fig. 4 a plan view of the front end of the scale-beam with the platform or pan removed; and Fig. 5 a section on line 5—5 of Fig. 4.

As herein shown, my scale is of the usual platform type, comprising the base 1, supporting standards 2, a scale beam 3 pivoted on such standards, a platform or pan 4 pivoted on the scale beam, and having a yoke 25 rigidly connected thereto which yoke forms an attaching means for the rod 26 which is pivoted to a link not shown within the base 1 for preserving the level of the pan, in connection with the barrel or drum indicating mechanism 5 supported at the upper ends of posts 6 rising from the base, which indicating mechanism is operated and controlled by the movements of the scale—all which parts are constructed and arranged to operate in the old and well-known manner.

As seen by reference to Figs. 2 and 3, the scale beam, as to its front end next the salesman, partakes of the form of an irregular shaped frame 3ª, while its rear end is in the form of an ordinary beam or lever extending to a position between the standards or posts 6. Within and as a part of the scale beam frame is formed a rectangular guide frame 7, having guideways or slides 8 on which travel or slide the projections or pins 9 of a movable or shiftable tare weight 10. This guide frame is positioned longitudinally of the scale beam and consequently the tare weight is movable longitudinally of such beam, with the result that the tare of any receptacle placed on the platform or pan may be taken up or compensated for.

Projecting centrally and forwardly from the tare weight is a rack 11 operatively connected with such weight and adapted to coöperate with and engage a pinion 12 suitably mounted on a fixed axis arranged in the scale beam frame. Immediately below this pinion and on the same axis is a second pinion 13 which is adapted to mesh with and be operated by a curved rack 14. This latter rack is formed as a branch arm of a lever 15 which is pivoted at its rear end and at a point 16 substantially central of the scale beam, as indicated in Figs. 4 and 5. This lever 15 extends forwardly to the front margin of the scale beam frame and is there upwardly turned and at its extreme upper end is provided with an inturned indicating finger or tooth 17 arranged to sweep over the tare scale 18 formed on the beveled front edge of the scale beam frame. This lever thus serves as an indicator or pointer and also as an operating lever for shifting the tare weight. A handle or knob 19 is provided on the pointer or lever to facilitate the movement and adjustment thereof.

It will be understood that in the normal position of the parts, the tare weight is at its forward limit of movement in the guide frame and at a point substantially central of the scale beam, and that movement thereof rearwardly the proper distance will serve to compensate for and counterbalance the tare of any receptacle placed on the platform or pan, whose pivotal connection with the scale beam is, in the present instance, forward of the pivotal bearings of the scale beam upon the supporting standards 2. Referring to Fig. 4, the tare weight is there shown in intermediate position, and the pointer 17 is arranged at the half way point on the scale 18, which indicates half its capacity as to tare. The normal position of the lever 15 and pointer 17 is at the left hand side of the tare scale when viewed from the position of the salesman, at which time the said pointer indicates zero. Movement of such lever to the right is transmitted through the curved rack 14 to the small pinion 13, thence to the larger pinion 14 and finally to the rack 11 and the attached tare weight 10, which is thereby moved or shifted rearwardly a distance corresponding to the distance of adjustment of the pointer 17. When an empty receptacle is placed on the platform in order to have its tare counterbalanced or provided for, the pointer 17 is shifted and the associated parts thereby operated in the manner described until the scale beam balances or if the weight of the receptacle itself is known in advance the pointer 17 may be immediately brought to a position on the tare scale indicating that same weight and the weighing and computing of the article may be proceeded with. Or, if desired, the receptacle may be weighed by the indicating mechanism or drum, and the pointer 17 immediately brought to a corresponding indication on the tare scale.

Now, referring to the back indication forming the other feature of my invention, I provide, at the rear of the machine adjacent the customer and below the drum or barrel, an indicating scale or dial 20 supported in suitable manner, as by the arms 6ª extending inwardly and upwardly from the posts or standards 6, as clearly indicated in Fig. 1. This scale 20 is formed on the arc of a circle described from the pivotal point or axis 21 of a pendulum 22, on which same axis moves the indicator or pointer 23 coöperating with the scale 20. This pointer 23 is secured to the pendulum sleeve 24 which is operatively connected with the rear end of the scale-beam in the usual and well known manner and therefore requires no detailed description. The indications on this scale 20 are all fully exposed to the customer who can therefore readily tell the exact weight to the point and fraction thereof by simply following and reading the indicator or pointer. The difficulty hereinbefore referred to in the use of the usual back indication in the barrel type of scale is therefore not experienced in the construction herein shown and above described.

The usual indicating mechanism for indicating weight and the value of the article is here shown as of the barrel or drum type and the same is operatively connected with the scale beam in the ordinary and well known manner, so as not to require any detailed description.

It will be understood that the direction of movement of the tare weight, in order to counterbalance the receptacle, depends upon the relative position of the pivotal points of the scale beam and the platform. In the present instance the pivotal points of the scale beam are rearward of the platform pivotal points, that is beyond the latter points, viewing them from the salesman's side, and consequently to counterbalance the tare, the tare weight must be moved rearwardly, that is, toward the indicating mechanism, whereas in case the respective pivotal points were reversed in relative arrangement, the tare weight would have to be moved forwardly, that is, in the opposite direction, for said purpose. With the scale beam and platform pivotal points so reversed a pendulum such as 22 connected with the rear end of the scale beam in the usual and well-known manner as stated, would be normally pendent inasmuch as a load placed upon the platform would depress this end of the beam and the measure of weight would necessarily have to be determined by increasing resistance of the pendulum in rising. On the other hand, with the beam and platform pivotal points related as shown and described a load placed upon the platform necessarily elevates the rear end of the beam and though the pendulum is as stated connected by well known instrumentalities with such rear end of the beam, its upward swing cannot be produced by the application of the load for such upward swing necessarily accompanies depression of the rear end of the beam and that takes place when the load is removed and not when it is applied for as stated the application of the load elevates the rear end of the beam. Consequently the preponderance of weight of the inner longer arm of the beam with its lateral projection for connection with the indicating drum rack rod, must be taken into consideration. The pendulum being connected with the rear end of the beam in the usual or well-known manner as stated, necessarily acts with the load to overcome the weight carried by the inner arm of the beam and so the measure of weight of the load is determined by the decreasing resistance of the pendulum as it lowers. As the pendulum is shown pendent in Fig. 1 of the drawings, it must be assumed that the platform is depressed to the limit. The removal of the load from the platform would of course result in a lowering of the rear end of the beam to the limit. Under the tare arrangement shown, the sliding of the tare weight 10 toward this rear end of the beam would of course add to the preponderance of weight carried by the inner arm of the beam and require the application of an amount of weight, as that of a receptacle for goods, corresponding with that indicated on the tare scale 18, before there would be any movement of the pendulum. It should be noted that the indicating drum rack is on the forward side of the drum pinion (Fig. 3) instead of on the rear side as customary when the platform is on the same side of the beam pivot as the indicator and pendulum connection. This reversal of relation between the rack and pinion provides for rotation of the indicating drum in the same direction when the inner arm of the beam rises as it would rotate under the reversed relation of beam and platform pivots when the inner arm of the beam descends and the rack is on the rear side of the pinion.

I claim:

1. In apparatus of the character described, the combination with a scale beam, indicating means, and load-counterbalancing means, all operatively connected together, of a tare-weight carried by the scale beam and movable longitudinally thereof; a handle lever movable crosswise the scale beam; and operating connections between said lever and the tare weight for converting the cross-wise movement of the former into longitudinal movement of said weight.

2. In apparatus of the character described, the combination with a scale beam, indicating means, and load-counterbalancing means, all operatively connected together and the scale beam having graduations extending across one end thereof; of a tare-weight carried by the scale beam and movable longitudinally thereof; a handle lever movable crosswise the scale beam, in association with the aforesaid graduations thereof; and operating connections between said lever and the tare weight for converting the cross-wise movement of the former into longitudinal movement of said weight.

3. In apparatus of the character described, the combination with a scale beam, indicating means, and load-counterbalancing means, all operatively connected together and the scale beam having graduations extending across one end thereof; of a tare-weight carried by the scale beam and movable longitudinally thereof; a handle lever movable crosswise the scale beam and projecting beyond the end of the scale beam and having a pointer extending over the graduations on the latter, and operating connections between the said lever and the tare weight for converting the cross-wise movement of the former into longitudinal movement of said weight.

4. A scale comprising indicating mechanism, a scale lever coöperating therewith and formed at its forward end into a frame 3ª, a guide frame within said frame 3ª, and a tare weight movable within said guide frame and longitudinally of the scale lever, substantially as described.

5. A scale comprising indicating mechanism, a scale lever coöperating therewith, a tare weight movable longitudinally and centrally in said scale lever and having a projecting rack, a pinion mounted in such scale lever and coöperating with the rack, an indicator or pointer, and a rack carried by such pointer and operatively connected with the pinion; substantially as described.

6. A scale comprising indicating mechanism, a scale lever coöperating therewith, a tare weight movable longitudinally and centrally in said scale lever and having a projecting rack, a pinion mounted in such scale lever and meshing with the rack, a second pinion arranged to turn on the same axis as the first pinion, a curved rack meshing with said second pinion, and means for operating said curved rack; substantially as described.

7. A scale comprising indicating mechanism, a scale lever coöperating therewith, a tare weight movable longitudinally and centrally in said scale lever and having a projecting rack, a pinion mounted in such scale lever and meshing with the rack, a second pinion coöperating with the first pinion, a curved rack meshing with said second pinion, and an indicator or pointer operating said curved rack; substantially as described.

8. A scale comprising indicating mechanism, a scale lever coöperating therewith, a tare weight movable longitudinally and centrally in said scale lever and having a projecting rack, a pinion mounted in such scale lever and meshing with the rack, a second pinion coöperating with the first pinion, and an indicator or pointer having a branch arm forming a curved rack arranged to coöperate and drive the second pinion; substantially as described.

9. The combination of a scale lever 3, having a frame 3ª, a guide frame 7 therein provided with guides 8, a tare weight 10 movable in said guides, and means for moving or shifting such weight; substantially as described.

10. The combination of a scale lever 3, having a frame 3ª, a guide frame 7 therein provided with guides 8, a tare weight 10 having lateral lugs 9 arranged to slide on said guides, and means for moving or shifting such weight; substantially as described.

11. In apparatus of the character described, the combination of indicating means, load-counterbalancing means, a scale-beam formed as a frame at one end and bearing graduations on a side of said frame which extends crosswise the beam, a tare-weight carried by the beam and movable longitudinally thereof, an adjusting member movable along the graduated side of the frame; and operating connections between said member and the tare weight.

12. In apparatus of the character described, the combination of indicating means, load-counterbalancing means, a scale-beam formed as a frame at one end and bearing graduations on a side of said frame which extends crosswise the beam, a tare-weight carried by the beam and movable longitudinally thereof, a handle lever projecting beyond said graduated side of the frame and having a pointer overlying the graduations; and operating connections between said lever and the tare weight.

13. In apparatus of the character described, the combination of indicating means, load-counterbalancing means, a scale-beam formed as a frame at one end and bearing graduations on a side of said frame which extends crosswise the beam, said scale beam also formed with a longitudinally extending guide-way; a tare-weight engaging the said guideway and having a rack extending longitudinally of the scale-beam within the frame thereof; a handle lever pivoted on the scale beam and projecting beyond the graduated side of said frame and having a pointer overlying the graduations, said lever carrying a rack; and a compound pinion whose members mesh respectively with the latter and the rack of the tare-weight.

14. In apparatus of the character described, the combination with a scale-beam, an indicating drum extending transversely thereof and operatively connected therewith, and load-counterbalacing means, of a fixed scale faced oppositely to said drum; a pointer arranged to swing in association with said fixed scale; and operating connections between said pointer and the scale beam.

ALLEN DE VILBISS, Jr.

Witnesses:
V. GORDON STAID,
ROBERT F. GROSSELL.